United States Patent [19]

Kramer et al.

[11] Patent Number: 4,679,765

[45] Date of Patent: Jul. 14, 1987

[54] LOW LEAKAGE ORIFICE-CONTROLLED POPPET VALVE

[75] Inventors: Kenneth D. Kramer, Waterloo, Iowa; Rohn L. Olson, North Richland Hills, Tex.

[73] Assignee: Deere & Company, Moline, Ill.

[21] Appl. No.: 853,312

[22] Filed: Apr. 14, 1986

[51] Int. Cl.⁴ .............................................. F16K 31/122
[52] U.S. Cl. .................................... 251/38; 251/30.04; 251/282
[58] Field of Search ................. 251/30.04, 35, 38, 282

[56] References Cited

U.S. PATENT DOCUMENTS

| | | |
|---|---|---|
| 2,694,544 | 11/1954 | Hall ..................................... 251/38 X |
| 3,033,228 | 5/1962 | Mohler .......................... 251/30.04 X |
| 3,114,532 | 12/1963 | Gray et al. . |
| 3,893,471 | 7/1975 | Byers, Jr. . |
| 4,174,824 | 11/1979 | Kolze . |
| 4,201,362 | 5/1980 | Nishimi et al. . |
| 4,494,726 | 1/1985 | Kumar et al. . |

FOREIGN PATENT DOCUMENTS

| | | |
|---|---|---|
| 910858 | 5/1954 | Fed. Rep. of Germany ... 251/30.04 |
| 3021130 | 12/1981 | Fed. Rep. of Germany . |
| 395672 | 12/1965 | Switzerland ..................... 251/30.04 |
| 837899 | 6/1960 | United Kingdom .................. 251/38 |

Primary Examiner—Robert G. Nilson

[57] ABSTRACT

An orifice controlled poppet valve includes a pilot poppet pressure balancing arrangement which prevents fluid leakage between the valve inlet and outlet. The pressure balancing arrangement includes a pin slidable in a passage in the main valve member, which passage extends between the inlet and a pilot outlet passage. One end of the pin engages a stem which projects from from the pilot poppet. The other end of the pin engages a flexible diaphragm which forms a seal between the valve inlet and the passage which receives the pin. An inlet pilot passage includes an annular clearance upstream of an orifice. The radial dimension of the annular clearance is smaller than the diameter of the orifice.

11 Claims, 5 Drawing Figures

LOW LEAKAGE ORIFICE-CONTROLLED POPPET VALVE

BACKGROUND OF THE INVENTION

This invention relates to a solenoid-operated, pilot-controlled control valve.

Poppet-type valves have traditionally been used as on/off valves or for pressure control, while spool valves have been traditionally used for precision control. However, since poppet-type valves are less prone to contamination, there is a desire to use poppet-type valves for precision control as well.

An example of a poppet-type control valve is found in U.S. Pat. No. 3,893,471 issued to Byers, Jr. in 1975. Such valves have a pressure-balancing pin which is used to hydrodynamically balance the pilot poppet so that the only forces which act on the pilot poppet are a spring force and a solenoid coil force, thereby making the valve insensitive to load variations. However, in such a valve, when its solenoid is off, there is a fluid leakage path from inlet to outlet between the pressure balancing pin and the armature. Such leakage is acceptable when the solenoid is "on" and the valve is open. However, when the solenoid is off, such leakage can lead to "drift" of the actuator or device controlled by the valve.

One solution to this problem is described in U.S. Pat. No. 4,494,726 issued Jan. 22, 1985 to Kumar et al and assigned to the assignee of this application. The '726 valve includes a check valve in the leakage path downstream of the pressure-balancing pin. However, the space taken up by this check valve means that the initial movement of the armature will only open the check valve, thereby leaving less armature movement available for control purposes. This check valve arrangement also increases the complexity and cost of the valve while adversely effecting reliability.

An alternative to the check valve solution of '726 would be to provide an O-ring seal between the pressure-balancing pin and the wall of the armature bore which receives it. However, such a sealing arrangement would produce a friction or sticking problem which would adversely effect smooth valve operation.

Furthermore, both the '471 and '726 valves have armatures which must be inserted into the valve assembly after insertion of the pressure-balancing pin. Such an assembly is difficult to align because of the close fit between the armature and pressure-balancing pin it receives. Also, both of these valves have inlet pilot passages or orifices which may be blocked by particles of debris in the hydraulic fluid.

SUMMARY OF THE INVENTION

An object of this invention is to provide a poppet-type valve with a hydrodynamically balanced pilot poppet which is simple to assemble.

Another object of this invention is to provide such a valve which is free from fluid leakage and which operates smoothly.

A further object of this invention is to provide such a valve with a metering orifice which is protected from being plugged by contaminants.

These and other objects are achieved by the present invention which has a main valve member movable in a housing to control fluid flow between an inlet and an outlet. The main valve member moves in response to fluid pressure changes in a pilot chamber. The main valve member includes an inlet pilot passage therein which communicates the inlet with the pilot chamber and an outlet pilot passage which communicates the pilot chamber with the outlet. A pilot poppet is movable in relation to a pilot valve seat on the main valve member to control communication through the outlet pilot passage. A third passage in the main valve member extends between the inlet and outlet pilot passages. A pressure-balancing pin is slidable in the third passage. A flexible diaphragm sealingly covers the end of the third passage which opens into the inlet passage and the pin engages the diaphragm. The other end of the pin engages a stem which projects from the pilot poppet and extends through a portion of the outlet pilot passage. When the pilot poppet engages the pilot valve seat, the pin is moved slightly into the diaphragm to form a small depression therein. The diaphragm and the fluid pressure in the inlet pilot passage, which acts upon the pin through the diaphragm, together balance the fluid pressure forces which would otherwise urge the pilot poppet into engagement with the pilot valve seat. The diaphragm positively seals between the inlet and outlet pilot passages so that no fluid leakage can flow through this hydrodynamical balancing system.

Because the pressure-balancing pin is received by the main valve member and not by the pilot poppet, there is no alignment problem during assembly when the armature and pilot poppet are inserted into place inside the housing and the solenoid coil.

A metering orifice in the inlet pilot passage is formed by a plug which is threadably received by the main valve member. The plug and the main valve member form an annular clearance therebetween. This annular clearance forms a portion of the inlet pilot passage between the inlet and the orifice. The radial width of this clearance is smaller than the diameter of the orifice so that particles which would otherwise plug the orifice are instead trapped by the annular clearance.

DETAILED DESCRIPTION

Figure 1:
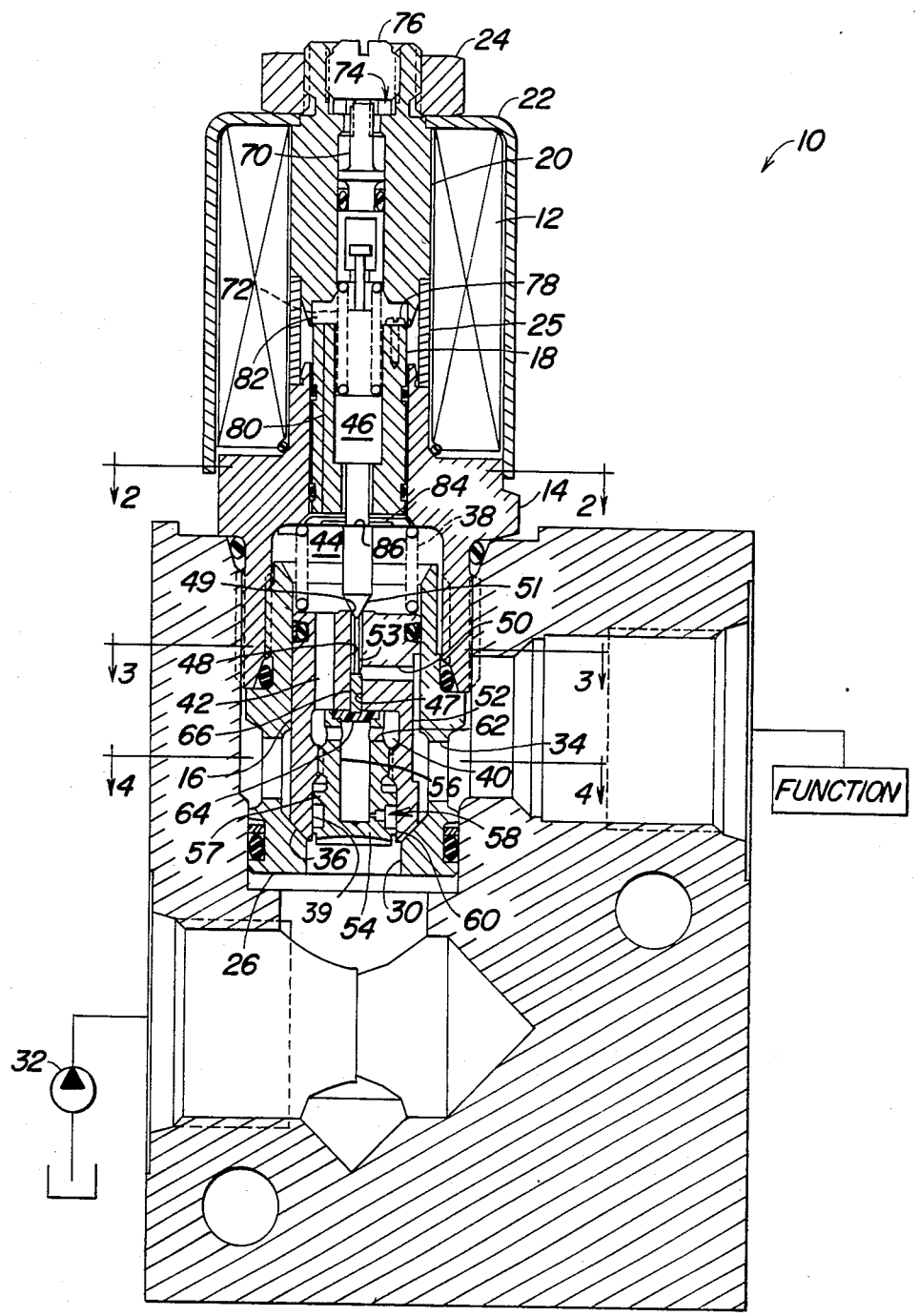
FIG. 1 is a partial, cross-sectional view of a solenoid-operated, pilot-controlled poppet valve constructed according to the present invention.
Figure 2:
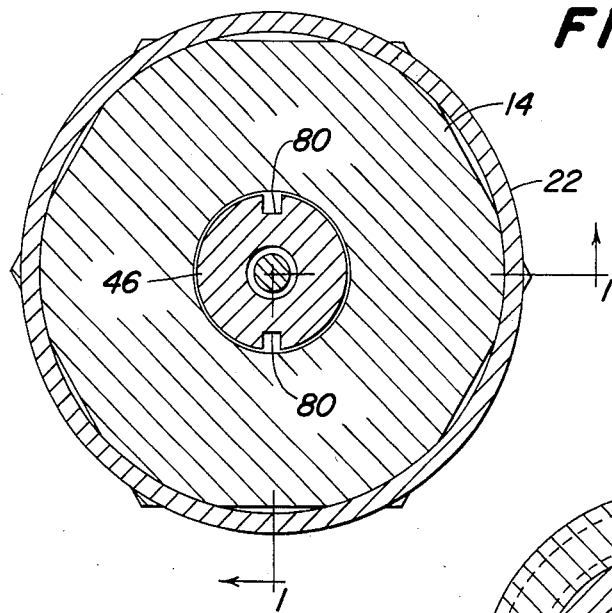
FIG. 2 is a cross-sectional view taken along lines 2—2 of FIG. 1.
Figure 3:
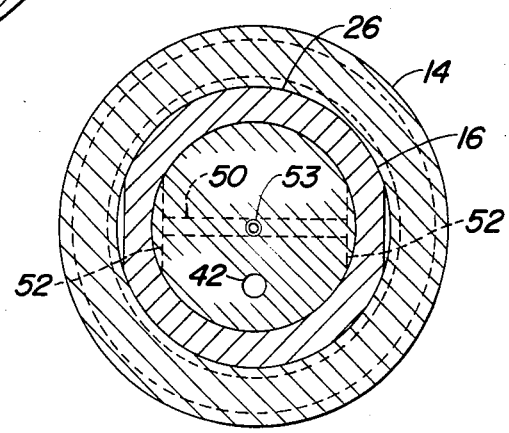
FIG. 3 is a cross-sectional view taken along lines 3—3 of FIG. 1.
Figure 4:
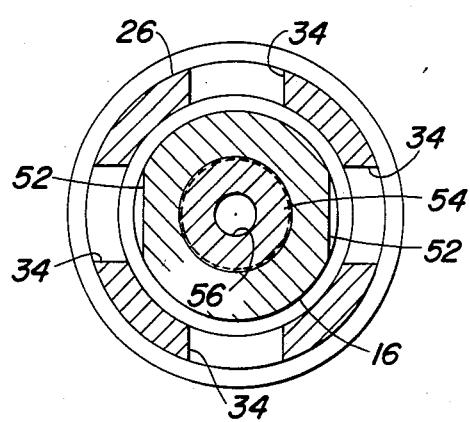
FIG. 4 is a cross-sectional view taken along lines 4—4 of FIG. 1

A solenoid-operated orifice control valve 10 includes a coil 12 and a hollow housing base 14 surrounding a valve member 16 and an armature 18. Other housing-related parts include a hollow cap 20 and a cover 22 which is retained on cap 20 by nut 24. The base 14 and cap 20 are spaced apart by a hollow cylindrical bushing 25. A hollow housing sleeve 26 is received by base 14 and is threadably and sealingly connected thereto by O-ring seal 28. The housing base 14, the armature 18, the cap 20 and the cover 22 are made of ferro-magnetic material, while the other parts are made of non-magnetic material, such as stainless steel.

The sleeve 26 forms an inlet 30 for connecting to a source of fluid pressure, such as pumps 32, and an outlet 34 for connecting to a fluid-operated device (not shown). The sleeve 26 forms an annular main valve seat 36 between inlet 30 and outlet 34.

The valve member 16 is movable in the sleeve 26 and is engageable with the main seat 36 to control fluid flow from inlet 30 to outlet 34. Spring 38 urges valve member 16 into engagement with seal 36. Valve member 16 includes a bore 39 which, at one end, is open to the inlet 30. An axial inlet pilot passage 42 communicates the other end of bore 39 with a pilot or control chamber 44 which is enclosed by valve member 16, sleeve 26, housing base 14, armature 18 and a pilot poppet 46.

Pilot poppet 46 includes a frustoconical surface portion 51 from which extends a stem 53.

A stepped central axial bore extends through valve member 16 and includes a larger diameter bore portion 47 which opens into the inner end of bore 39 and a smaller diameter portion 48 which opens into chamber 44. A pair of passages 50 extend radially outwardly in opposite directions from the intersection of bores 47 and 48 to a corresponding pair of flat portions 52 on the surface of valve member 16. The surface of valve member 16 surrounding the outer end of passage 48 forms a pilot valve seat 49 which is engageable with the frustoconical end surface of pilot poppet 46.

Bore 48, radial passages 50 and flats 52 form an outlet pilot passage which communicates fluid from pilot valve seat 49 to the outlet 34.

There is an annular clearance between stem 53 and the wall of passage 48 so that fluid may flow through passage 48 when pilot poppet surface 51 is spaced apart from pilot seat 49.

Valve member 16 threadably receives a hollow plug 54 in bore 39. Plug 54 has a blind, stepped bore 56 therein which opens away from inlet 30. Plug 54 and valve member 16 together enclose a cavity 40 which is communicated to chamber 44 by passage 42 and which is communicated with inlet 30 via metering orifice 58.

Plug 54 has an annular land 57 which closely fits the bore 39 to accurately position plug 54 in the bore 39. An annular land 60 is located near the outer end of plug 54. An orifice 58 extends radially into plug 54 between lands 57 and 60 and communicates blind bore 56 with inlet 30 past land 60. There is a predetermined annular clearance between land 60 and the wall of bore 39. The radial width of this clearance is preferably less than the diameter of the metering orifice 58 so that particles which would otherwise plug orifice 58 are instead trapped by land 60. The total cross-sectional area of this annular clearance is much larger than the area of orifice 58 so that any particles can be trapped without significantly effecting fluid communication between inlet 30 and orifice 58. Orifice 58 is preferably sized so that the control pressure in cavity 40 and in chamber 44 will be approximately 90% of inlet pressure. Radial passage 62 communicates bore 56 with cavity 40. A flexible (preferably rubber) diaphram 64 is received in the larger diameter portion of blind stepped bore 56 and prevents communication between blind bore 56 and outlet pilot passage 47.

A pressure-balancing pin 66 is positioned in outlet pilot passage 47. Pin 66 has an end which is pressed into and forms a recess in the diaphram 64. Pin 66 extends to a position slightly past one edge of radial passage 50 where it engages the end of the stem 53 of poppet member 46.

One end of pin 66 is exposed to outlet fluid pressure via flat 52 and radial passage 50. Inlet fluid pressure downstream of orifice 58 acts on the other end of pin 66 through diaphram 64. Preferably, the diameters of pilot seat 49, of bore 47 and of pin 66 are chosen so that the effective pressure-responsive area of the combination of pin 66 and diaphram 64, which is exposed to control pressure, is essentially equal to the net effective area of pilot poppet 46 upon which the control pressure acts to urge pilot poppet towards seat 49. In this way, pilot poppet 46 will be hydrodynamically balanced so that the only forces acting upon it will be due to spring 72 and coil 12.

When pilot poppet 46 is seated against pilot seat 49, there is no leakage flow from the inlet 30 to outlet 34 via pressure-balancing pin 66 because diaphram 64 sealingly engages the surface of valve member surrounding the end of outlet pilot passage 47. Thus, this diaphram and pressure-balancing pin arrangement prevents leakage flow while still moving in response to differential pressure changes. Since the pressure-balancing pin 66 is located inside valve member 16, the pilot poppet 46 may be a simple solid part, whereas the prior art pressure-balancing pin arrangements required that the pilot poppet be hollow.

The cap 20 slidably and sealingly receives a pilot adjusting piston 70. A spring 72 is compressed between piston 70 and pilot poppet 46 and urges the pilot poppet away from piston 70 and into engagement with pilot valve seat 49. Shims 74 and locking screw 76 cooperate to adjust the position of piston 70, thereby adjusting the bias of spring 72. The minimum axial gap between armature 18 and cap 20 is controlled by spacer screw 78 which is screwed into the end of armature 18. The armature includes a pair of axially extending grooves 80 to communicate fluid pressure in chamber 44 to chamber 82, whereupon it acts upon pilot poppet 46 to balance the effect of pressure in chamber 44 on pilot poppet 46. The pilot poppet 46 carries a snap ring 84 which rests against a shoulder 86 and which is engageable with the end of armature 18. This engagement, together with the engagement of spacer screw 78 with cap 20, limits the maximum opening of main valve member 16 with respect to valve seat 36.

Figure 5:
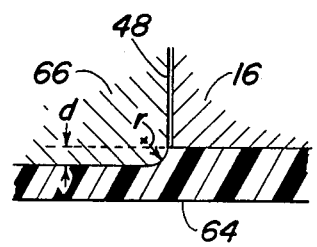
FIG. 5 is an enlarged view of a portion of FIG. 1 showing details of the diaphragm and pressure-balancing pin arrangement of the present invention.

Turning now to FIG. 5, we see that the pressure-balancing pin 66 extends beyond the end passage 47 by a distance d, preferably around 0.11 millimeters, thus forming a depression in diaphram 64. Preferably, the edge of pin 66 is rounded with a radius of curvature which is slightly larger than the distance d, for example, 0.13 millimeters. Such a rounded edge prevents damage to the diaphram 64.

While the invention has been described in conjuction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. In a pilot-operated control valve having a housing defining a fluid inlet and a fluid outlet, a main valve member movable in the housing to control fluid communication between the inlet and the outlet, the main valve member having a pilot passage therein extending between the inlet and outlet and having a pilot valve seat surrounding a portion of the pilot passage, the control valve also having a pilot poppet engageable with the pilot valve seat and movable in relation thereto to control fluid communication through the pilot passage to thereby control movement of the main valve member, and having means for hydrodynamically balancing the pilot poppet, characterized by:

the pilot poppet being a solid member; and the balancing means being completely received by the main valve member.

2. The control valve of claim 1, wherein:

the balancing means further comprises means for preventing leakage fluid communication from the inlet to the outlet.

3. In a pilot-operated control valve having a housing defining a fluid inlet and a fluid outlet, a main valve member movable in the housing to control fluid communication between the inlet and the outlet, the main valve member having a pilot passage therein extending between the inlet and outlet and having a pilot valve seat surrounding a portion of the pilot passage, the control valve also having a pilot poppet engageable with the pilot valve seat and movable in relation thereto to control fluid communication through the pilot passage to thereby control movement of the main valve member, and having means for hydrodynamically balancing the pilot poppet, the improvement wherein:

the balancing means comprises a cylindrical pin slidably received in the pilot passage, engageable with an end of the pilot poppet and movable in response to a pressure differential upstream and downstream of the pilot valve seat.

4. The control valve of claim 3, wherein:

one end of the pin is exposed to fluid pressure in a section of the pilot passage downstream of the pilot valve seat, pressure in a section of the pilot passage upstream of the pilot valve seat acting upon the other end of the pin.

5. The control valve of claim 3, wherein:

the housing and the main valve member define a control chamber therebetween;

the pilot passage comprising a first passage extending from the inlet to the control chamber, a second passage extending from the control chamber to the outlet and a third passage extending between the first and second passages, the pin being slidably received in the third passage; and a flexible diaphram is mounted in the first passage, the diaphram sealingly engaging a surface of the valve member surrounding an end the third passage and engaging an end of the pin, the upstream pilot passage pressure acting on the pin through the diaphram.

6. The control valve of claim 5, further comprising:

resilient means engaging the pilot poppet and biased to urge the pilot poppet into engagement with the pilot valve seat; and actuator means for moving the pilot poppet away from the valve seat.

7. The control valve of claim 6, wherein:

the pilot poppet comprises a valve surface for sealing engagement with the pilot valve seat and a stem which projects axially from said valve surface and which extends through the pilot passage to an end, said end engaging the pin, engagement of said end with said pin causing said pin to form a recess in the diaphram when the valve surface is in engagement with the pilot valve seat.

8. The control valve of claim 5, wherein:

the pilot poppet has an effective pressure-responsive area upon which fluid pressure acts to urge the pilot poppet towards engagement with the poppet valve seat; and the diaphram and the pin cooperating to form a pressure-responsive area substantially equal to an effective pressure-responsive area of the pilot poppet, fluid pressure acting upon the pressure-responsive area of the diaphram and pin to urge the diaphram into engagement with the pin and the pin into engagement with the pilot poppet, thereby urging the pilot poppet away from engagement with the pilot valve seat.

9. A pilot-operated control valve, comprising:

a housing having a valve bore therein, an inlet communicating the valve bore with a fluid pressure source and an outlet communicating the valve bore with a fluid-operated function, a wall of the valve bore forming a main valve seat between the inlet and the outlet;

a valve assembly movable in the valve bore relative to the valve seat to control fluid flow from the inlet to the outlet, the valve assembly and the housing enclosing a pilot chamber therebetween, the valve assembly moving in response to changes in pressure in the pilot chamber, the valve assembly and the housing enclosing a pilot chamber therebetween, the valve assembly moving in response to changes in pressure in the pilot chamber, the valve assembly comprising:

a valve member having a blind bore extending therein from an end which is open to the inlet;

a first passage extending from the inner end of the blind bore to the pilot chamber, a second passage for communicating fluid from the pilot chamber to the outlet and a third passage extending between the first and second passages;

a plug member received in the blind bore, the plug having an annular groove in one end, an annular land positioned between the inlet and the groove, the land and a wall of the blind bore defining an annular opening therebetween with a certain radial width, the plug having a fourth passage therein, one end of which is in communication with the first passage, the plug further having an orifice communicating the groove with another end of the fourth passage, the orifice having a diameter which is smaller than the width of the annular opening, the annular opening, the groove, the fourth passage the blind bore and the first passage all forming portions of a pilot passage communicating the inlet with the pilot chamber;

a flexible diaphram sealingly engaging a surface of the valve member surrounding an end of the third passage and blocking fluid communication between the third passage and the pilot passage;

a pressure-balancing pin slidably received by the third passage, one end of the pin being exposed to fluid pressure in the outlet chamber and the other end of the pin engaging the diaphram so that fluid pressure in the pilot passage acts on said other end through the diaphram; and the control valve further comprising a pilot valve member movable to control fluid flow through the second passage, the pilot valve member having an end which engages the one end of the pin so that movement of the pin moves the pilot valve member.

10. The control valve of claim 9, wherein:
the diaphram is received by a recess in an inner end of the plug member, the plug member holding the diaphram in sealing engagement with a surface of the valve member surrounding an end of the third passage.

11. The control valve of claim 9, wherein:
the pilot valve member includes a stem which extends through a portion of the second passage to the end which engages the pin.

* * * * *